United States Patent [19]

Davies

[11] 4,038,424
[45] July 26, 1977

[54] VEGETABLE SAUCE COMPOSITION

[75] Inventor: Donald L. Davies, Glen Ellyn, DuPage, Ill.

[73] Assignee: Swift & Company, Chicago, Ill.

[21] Appl. No.: 651,408

[22] Filed: Jan. 22, 1976

[51] Int. Cl.² .............................................. A23L 1/24
[52] U.S. Cl. ..................................... 426/94; 426/589; 426/652; 426/653; 426/517; 426/516
[58] Field of Search ................... 426/589, 564, 94, 95, 426/102, 652, 653, 601, 602

[56] References Cited

U.S. PATENT DOCUMENTS

| 121,162 | 11/1871 | de la Peyrouse | 426/589 |
|---|---|---|---|
| 1,236,831 | 8/1917 | Fatica | 426/589 |
| 2,168,360 | 8/1939 | Musher | 426/589 |
| 3,245,805 | 4/1966 | O'Neil | 426/589 |
| 3,652,299 | 3/1972 | Penton | 426/589 |

Primary Examiner—Jeanette M. Hunter
Attorney, Agent, or Firm—Edward T. McCabe; Charles E. Bouton; W. C. Davis

[57] ABSTRACT

A vegetable sauce containing a vegetable paste an edible fat and other ingredients is blended, heated, air is injected, and the sauce is chilled and extruded into congealed strand-like form.

12 Claims, No Drawings

VEGETABLE SAUCE COMPOSITION

The present invention is directed to the food art and more particularly to an improved vegetable sauce composition and a method for the manufacture thereof. More specifically, the present invention is directed to the preparation of a tomato sauce in solid extruded form.

In the food art, cooks often find it difficult to apportion and apply certain ingredients when preparing food products. For instance, it is difficult and time consuming to accurately dispense and evenly spread a measured quantity of a liquid or paste-like substance across the surface of a food product. The problem is accentuated where the cook is preparing a number of such products; and the problem assumes even larger significance in the mass production of uniform food items having prescribed ingredient weight characteristics.

The production of pizzas has presented a problem of this type. Most pizzas involve a dough or bread-like base and a first layer of tomato sauce. One or more varieties of cheese may then be applied in a substantially even layer and thereafter a number of food ingredients such as sausage slices, mushrooms, peppers, anchovies and the like may be applied in a pattern. All of these ingredients with the exception of the tomato sauce are easily and quickly applied to the dough or bread base as they are normally available in a substantially solid form and can be sprinkled or deposited evenly and in measured quantity. However, heretofore several manipulations have been necessary to evenly distribute a measured quantity of a tomato sauce.

Accordingly, it is an object of the present invention to provide an improved vegetable sauce in a form that may be easily handled and distributed.

It is a further object of the present invention to provide an improved tomato sauce composition in the form of congealed substantially solid strands.

It is yet another object of the present invention to provide an improved method for producing a vegetable sauce composition that may be readily handled.

It is still another object of the present invention to provide an improved method for preparing a tomato sauce composition in a solid extruded form for distribution on food products such as pizzas and the like.

The present invention contemplates a mixture of a vegetable base with a sufficient quantity of a congealable fat to produce a mixture that may be chilled and extruded into strands which, when applied to a food product, may be rendered flowable by heating that product. In the context of this invention the term vegetable is intended to distinguish plants from animals and thus may include tubers, legumes, fruits and other herbaceous material, whereas the term fat in intended to include such material from either vegetable or animal sources.

Further objects and advantages will become apparent upon reading the following detailed description of a preferred embodiment of the present invention.

It has been discovered that vegetable sauces may be congealed and extruded into easily handled strands where a vegetable base is combined with a congealable edible fat at an elevated temperature and then chilled and extruded in solid or semi-solid form. Preferably, a small quantity of a nondeleterious gas, such as air, is injected and entrained in the heated ingredients. Also, other food ingredients such as one or more emulsifiers and flavoring materials may be admixed with the vegetable base and fat.

The most widely applicable, and preferred, composition contemplated according to this invention is a tomato sauce formulation comprising major amounts of a tomato paste and a hydrogenated vegetable fat. However, the invention is also believed to be applicable to pastes made from other vegetable materials and may also involve the use of animal fats. The fat, however, should be of a type that is normally congealed (solid) at room temperature (70°–72° F.). The tomato paste should comprise about 44 to 54% and the fat should comprise about 39 to 44% of the total mixture with the remainder being flavorings, preservatives and emulsifiers.

In a preferred application of the present invention major portions of a tomato paste and a fat are combined with minor amounts of tomato flavor enhancer, sodium citrate, onion salt, sugar, emulsifiers, and spices and the mixture is heated, while being blended, to about 160°–170° F. after which the heated mixture is pumped to a heat exchanger for chilling, and just before being chilled approximately 3% by volume of air is injected into the mixture. The aerated mixture is passed through a temperature exchanger such as a votator (a device having a temperature controlled shell and internal paddles) where it is rapidly chilled to about 70° F. and from which it is extruded in congealed form. The extrusion openings may be of a suitable shape and size with circular orifices of 1/8 inch to 3/8 inch diameter being preferred. At this point, the extruded strands are segmented into convenient lengths and may be immediately used with other food products or stored. If the extruded strands are not to be immediately utilized it is preferred to refrigerate and possibly freeze same.

the extruded strands may be handled as discrete particles and subsequently applied to a food product either alone or sequentially with other food ingredients. Also, the extruded strands may be admixed directly with other ingredients, such as cheese particles and the like, and the mixed materials applied to another product. A preferred application of the extruded strands, either alone or mixed with other materials, is in the manufacture of pizzas where accurate quantities may be measured out and then distributed either by hand or mechanically across the surface of a pizza base. Thereafter, when the pizza is heated for serving, the extruded strands will melt and the vegetable sauce will flow to cover all of the surface of the pizza.

As an example, a tomato sauce was prepared using the following ingredients:

| | |
|---|---|
| Tomato paste (28% solids) | 47.74% |
| Hydrogenated vegetable fat 100% soybean oil - "TEM COTE" manufactured by Swift & Company and having a Wiley melting point of 102° and SFI of 63 at 50° F., 50 at 70° F. and 42 at 80° F. | 40.75% |
| Tomato flavor ("MATO-MATE No. 239" manufactured by the Staley Company) | 5.1% |
| Sodium citrate | 3.0% |
| Onion salt | 1.5% |
| Sugar | 1.0% |
| Mono diglycerides emulsifier (produced from vegetable oils, "DUREM 114" manufactured by Durkee Foods, Inc.) | 0.3% |
| Lecithin | 0.2% |
| "MYVATEX 3-50" emulsifier (a blend of 58% propylene gly- | 0.2% |

-continued

| | |
|---|---|
| col monoester with 42% distilled monoglycerides prepared from soybean oil - manufactured by the Distilled Products Industries division of Eastman Kodak Co.) | |
| "TWEEN 60" emulsifier (polyoxyethelene sorbitan monostearate manufactured by ICI America Inc. | 0.2% |
| Oleoresin oregano | 0.007% |
| Oil of basil | 0.003% |

In combining the foregoing ingredients the tomato paste, tomato flavor, sodium citrate, onion salt, sugar, oleoresin oregano, and oil of basil were agitated together in a steam jacketed kettle. The fat was heated separately to about 120° F. and mixed with the remaining ingredients (which are mainly emulsifiers or having an emulsifying property) and this liquid mixture was added to the tomato paste and ingredients combined therewith in the steam jacketed kettle. The entire mixture was then heated to 160°-170° F. and then pumped from the kettle through a conduit to a heat exchanger (votator). During transit through the conduit air was injected in an amount sufficient to increase the volume of the total ingredients by about 3%. The heat exchanger was adjusted to chill the aforementioned aerated ingredients to a temperature of about 70° F. at which temperature the material was extruded from the heat exchanger through one or more circular orifices of approximately 3/16 inch diameter to produce discrete strands.

The aforementioned strands were solid at 70° F. and at room temperature. This material was utilized in the manufacture of pizzas as follows. Pizza dough was formed into platters and a quantity of the aforedescribed tomato sauce strands was combined with additional pizza topping ingredients and sprinkled evenly thereon. The topping ingredients were as follows:

| | |
|---|---|
| Provolone cheese shreds | 38.4% |
| Pizza cheese shreds | 33.4% |
| Tomato sauce strands | 17.8% |
| Mushrooms (freeze dehydrated and dipped in hot fat) | 6.6% |
| Tomato powder | 3.0% |
| Dehydrated green peppers | 0.7% |
| Onion salt | 0.08% |
| Garlic powder | 0.02% |

The cheese shreds were combined with the tomato sauce strands while the tomato powder, onion salt and garlic powder were separately mixed together. The two batches were then gently mixed together and the mushrooms and green peppers added. This resulted in the powdered ingredients dusting the surfaces of the larger pieces. The combined materials, which were suitable for separate packaging and storage, were then evenly sprinkled across the pizza platters.

The pizzas prepared as above described were cooked in a 400°-425° F. oven and served. All displayed excellent appearance and taste characteristics.

Obviously many modifications and variations of the invention as hereinbefore set forth may be made without departing from the spirit and scope thereof, and, therefore, only such limitations should be imposed as are indicated in the appended claims.

I claim:

1. An improved aerated food sauce composition, said composition comprising: extended strands of a tomato paste in an amount of about 44-54% of said composition combined with a fat congealable at room temperature in an amount of about 39-44% of said composition.

2. The food composition of claim 1 including at least one edible emulsifier material and wherein the ingredients are emulsified.

3. The food composition of claim 1 including minor amounts of flavor ingredients.

4. An improved method for preparing a vegetable sauce composition in substantially solid form, said method comprising: blending together a vegetable base in an amount of about 44-54% of said composition and a congealable edible fat in an amount of about 39-44% of said composition, injecting a gas into the blended materials, chilling the materials to a temperature at which the mixture will congeal, and extruding the chilled mixture into strands.

5. The method of claim 4 wherein the fat is normally congealed at about room temperature and the mixture is blended at about 160° F. or higher and chilled to about 70° F.

6. The method of claim 5 wherein the entrained gas is air which is injected during the blending of the ingredients and before the chilling thereof in an amount of increase the volume of said mixture by about 3%.

7. The method of claim 5 wherein the vegetable base is tomato paste.

8. The method of claim 5 wherein a minor amount of at least one emulsifier material is included with said vegetable base and fat and blended therewith.

9. The method of claim 8 wherein additional minor amounts of flavor ingredients are blended with said vegetable base and said fat.

10. The method of claim 5 wherein tomato paste comprises about 48% of the ingredients and the edible fat comprises about 41% of the ingredients.

11. The method of claim 5 wherein the extruded strands are subsequently frozen.

12. The method of claim 5 wherein the extruded strands are spread on the bread-like base and subsequently heated to a flowable temperature.

* * * * *